(12) United States Patent
Chen (10) Patent No.: US 6,404,622 B1
(45) Date of Patent: Jun. 11, 2002

(54) PORTABLE COMPUTER HOUSING

(76) Inventor: Jack Chen, 14 Kimberly Cir., Oak Brook, IL (US) 60521

( * ) Notice: Subject to any disclaimer, the term of this patent is extended or adjusted under 35 U.S.C. 154(b) by 0 days.

(21) Appl. No.: 09/538,256

(22) Filed: Mar. 30, 2000

(51) Int. Cl.[7] .................................................. G06F 1/16
(52) U.S. Cl. ..................... 361/681; 248/917; 312/223.2; 353/119
(58) Field of Search ................................ 361/681, 682; 248/917; 345/169, 905; 312/223.1–223.6, 223.7; 353/119–120, 122

(56) References Cited

U.S. PATENT DOCUMENTS

| | | | | |
|---|---|---|---|---|
| 5,808,862 A | * | 9/1998 | Robbins | 361/681 |
| 6,125,029 A | * | 9/2000 | Sasaki et al. | 361/681 |
| 6,151,529 A | * | 11/2000 | Batko | 700/28 |
| 6,181,550 B1 | * | 1/2001 | Kim | 361/683 |
| 6,191,938 B1 | * | 2/2001 | Ohgami et al. | 361/681 |
| 6,191,941 B1 | * | 2/2001 | Ito et al. | 361/683 |

* cited by examiner

*Primary Examiner*—Darren Schuberg
*Assistant Examiner*—Hung Van Duong
(74) *Attorney, Agent, or Firm*—Robert L. Marsh (57) ABSTRACT

A portable computer has a computer body having an upper surface, a lower surface, and a keyboard build into the upper surface. The computer further has a panel with a viewing screen on one surface which is joined to the computer body. The connection of the viewing screen to the computer body includes a first hinge which allows movement of the viewing screen between a travel position where the viewing screen is folded against the keyboard, and an operating position in which the screen is angled relative to the keyboard so as to be visible to one using the keyboard. The connection further includes a second hinge or a slide which enables the viewing screen to be folded with the back thereof against the computer body.

20 Claims, 8 Drawing Sheets

PORTABLE COMPUTER HOUSING

The present invention relates to the mounting of a video display panel on a portable computer and, in particular, to a panel that can be mounted so the video display is visible when the panel is folded against the body of the computer.

BACKGROUND OF THE INVENTION

Portable computers and notebook computers have a generally rectangular computer body and a panel with a viewing screen hinged along one side of the computer body such that the viewing screen is moveable from a first position in which the screen is folded against the keyboard of the computer to a second position where the viewing screen is opened and visible to an operator using the keyboard. When the viewing screen is folded against the keyboard, the computer has the appearance of a small suitcase or notebook and is easily transportable.

It is sometimes desirable to mount such portable computers in an automobile such that the information in the computer would be available to the operator of the vehicle. Preferably, the automobile has an adapter or dock which will mount the computer to the dashboard while the user is in his vehicle and permit the easy removal thereof by the user when the vehicle has reached its destination. The mounting must be adequate to secure the computer while the vehicle is traveling over rugged terrain. The mounting must also render the viewing screen visible to the occupants of the front seat, yet it must consume a minimum of the limited space available within an automobile.

Existing portable computers having a viewing screen hinged to the computer body are difficult to mount to the dashboard of a vehicle with the keyboard and viewing screen both useable by the occupants of the front seat of because of the limited movement of the parts permitted by the hinge. It would, therefore, be desirable to provide an improved housing for a portable computer which would enable the computer to be more readily mounted into an automobile.

Some 20 or more wires are needed to connect the screen of a portable computer to the computer body, and in prior art portable computers the wires limit the movement of a hinge connecting the screen to a computer body. If the hinge permits too much movement between the parts the repeated twisting of the connecting wires can cause the insulation between the wires to wear away, thereby causing the computer to fail.

It would be desirable to provide a hinge, or a hinged connector, between a computer and the associated screen which allows more movement between the parts without causing damage to the connecting wires.

SUMMARY OF THE INVENTION

Briefly, the present invention is embodied in a portable computer with a computer body having an upper surface, a lower surface, and a keyboard built into the upper surface thereof. The computer further has a panel with a viewing screen on one surface which is pivotally joined to the computer body.

In accordance with the invention, the connection of the viewing screen to the computer body includes a hinge which allows movement of the viewing screen between a travel position where the viewing screen is folded against the keyboard, and an operating position in which the screen is angled relative to the keyboard so as to be visible to one using the keyboard. The connection between the viewing screen and the computer body further includes an adjusting means which enables the viewing screen to be folded with the back thereof against the computer body.

The adjustment means may be configured as a second hinge. In accordance with this embodiment, the second hinge interacts with the first hinge to permit movement of the panel from a first position, in which the video screen is against the keyboard, to a second position in which the panel is wrapped around the computer body and the rear surface thereof is against the lower surface of the computer body.

In a second embodiment of the invention, the adjusting means includes a slideable member on which the hinge is retained, the slideable member is moveable from a first position near one long side of either the computer body or the panel to a second position near the opposite long side of the computer body or panel. The movement of the slideable member permits the reversal of the viewing screen from a first position in which it is folded against the keyboard to a second position in which the back surface of the viewing screen is against the keyboard.

In both embodiments the hinge assembly, whether it is a double hinge or a hinge with a slideable member, has a central opening through which the wires connecting the computer to the screen can pass. To prevent damage to the wire, the wires are formed into a ribbon and the ribbon is coiled before it is inserted into the hinge assembly.

BRIEF DESCRIPTION OF THE DRAWINGS

A better understanding of the present invention will be had after a reading of the following detailed description taken in conjunction with the following drawings wherein.

DETAILED DESCRIPTION OF THE PREFERRED EMBODIMENT

Figure 1:
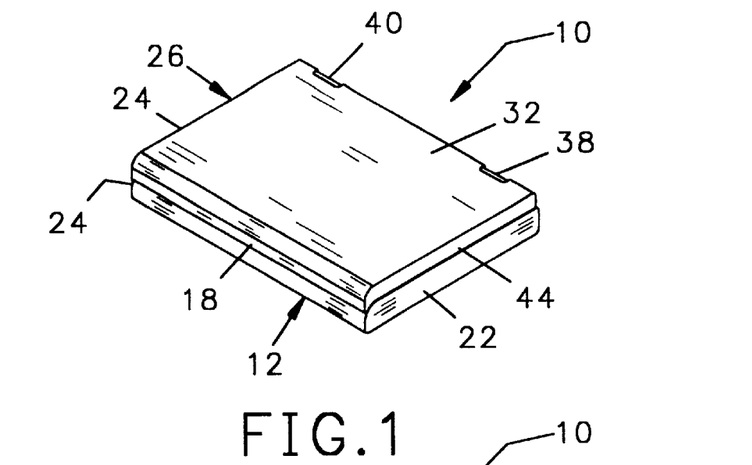
FIG. 1 is an isometric view of a computer in accordance with the present invention with the viewing screen closed down upon the keyboard.
Figure 2:
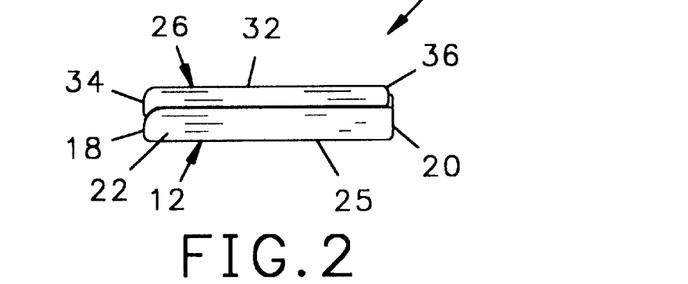
FIG. 2 is a side view of the computer as depicted in FIG. 1.
Figure 3:
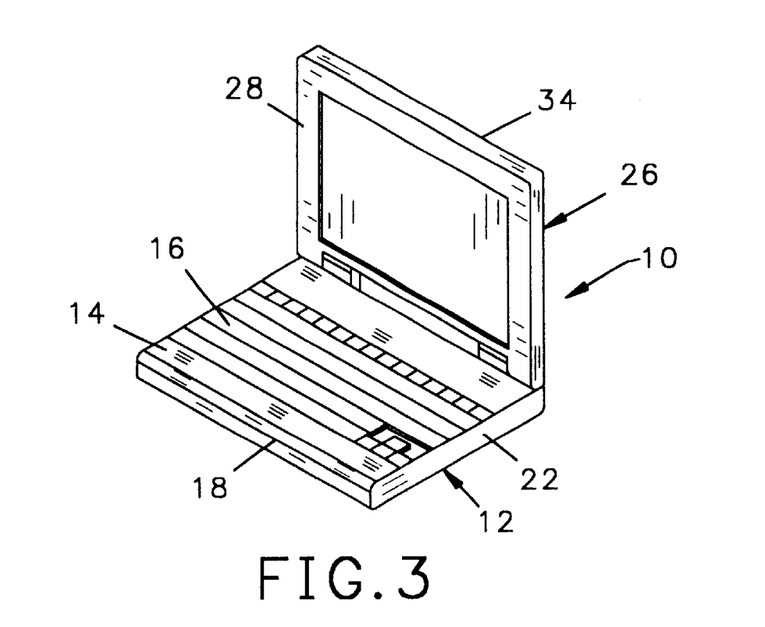
FIG. 3 is an isometric view of the computer shown in FIG. 1 with the viewing screen open with respect to the computer body rendering it useable as a conventional portable computer.

Referring to FIGS. 1, 2 and 3, a portable computer, or notebook computer, 10 has a housing body 12 having an upper surface 14 in which there is a keyboard 16. The body 12 is generally rectangular in shape having opposing long sides 18, 20 and short sides 22, 24, and opposite the upper surface 14 is a lower surface 25. Within the housing body 12 are electronic components 27 (shown only in FIG. 10 and 11) of the computer 10.

The computer also includes a cover panel 26 hinged to the housing body 12 as further described below. The cover panel 26 has an outer surface 32 which is visible when the computer 10 is in the carrying orientation as shown in FIG. 1, a forward surface 28 having a viewing screen thereon, visible in FIG. 3, and within the cover panel 26 are other electronic components 29 (again, only shown in FIGS. 10 and 11).

The panel 26 has an outermost long side 34, an opposing hinged long side 36 retained to the panel body by hinge members 38, 40 and has short sides 42, 44. The short sides 42, 44 are approximately equal to the lengths of the short sides 22, 24 of the computer body 12, and long sides 34, 36 are approximately equal to the lengths of the long sides 18, 20 of the computer body.

Existing portable computers have a single hinge between the panel 26 and the body 12 permitting movement of the panel between a transporting position in which the viewing screen 28 is folded against the keyboard 16 as shown in FIGS. 1 and 2 to a second operating position in which the panel 26 is retained at an angle with respect to the body 12 so as to be visible to an operator using the keyboard 16 as shown in FIG. 3.

Figure 4:
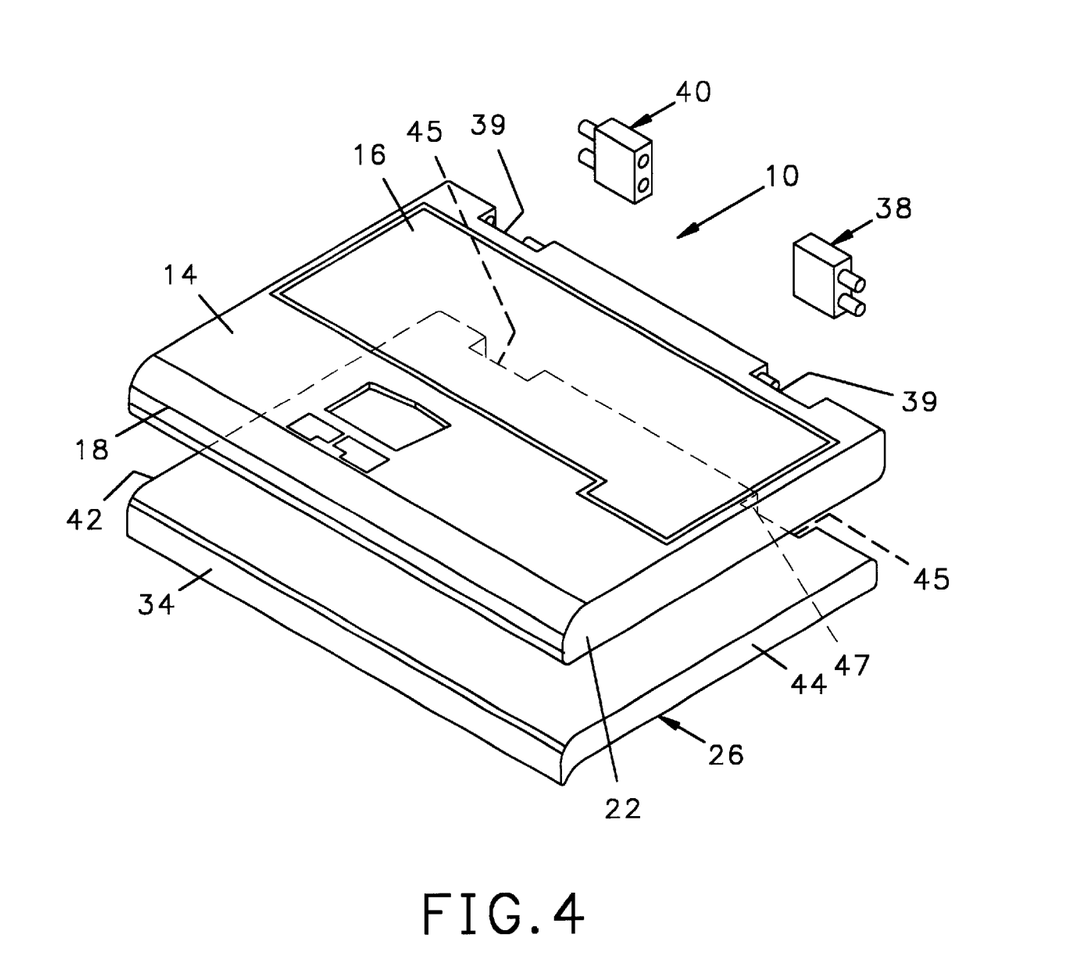
FIG. 4 is an enlarged exploded view of the hinge assembly for retaining the viewing screen to the computer body.
Figure 5:
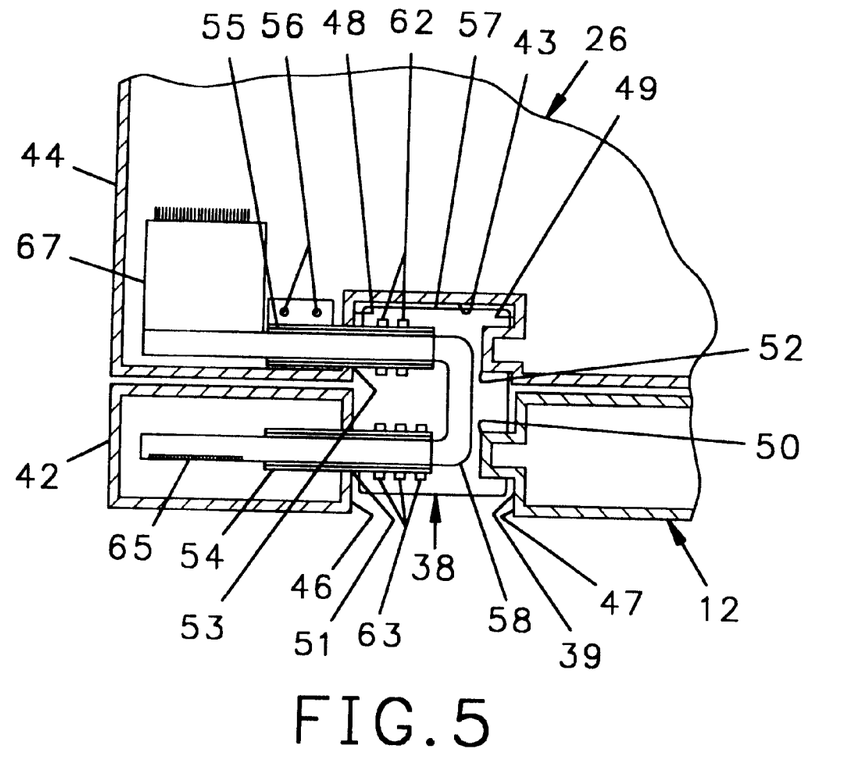
FIG. 5 is an enlarged fragmentary cross sectional view of the assembled hinge assembly shown in FIG. 4.
Figure 6:
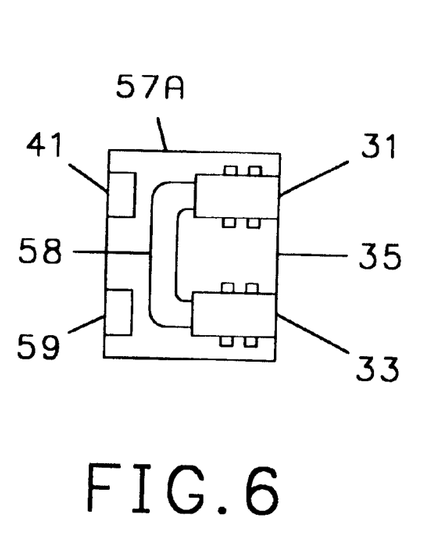
FIG. 6 is an enlarged front elevational view of one of the halves of a hinge member employed in the hinge assembly shown in FIG. 4.
Figure 7:
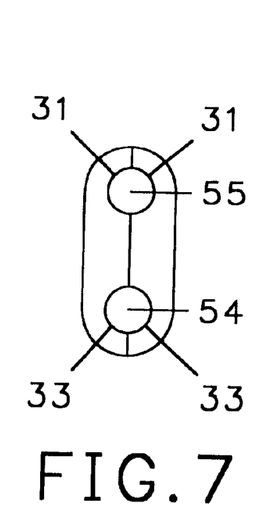
FIG. 7 is an end view of an assembled hinge member employed in the hinge assembly shown in FIG. 4.

Referring to FIGS. 4, 5, 6, and 7, the hinge members 38, 40 fit within notched out portions 39, 41 in long slide 20 of the body 12 and in aligned notched out portions 43, 45 of the long side 36 of panel 26. Hinge assembly 38, shown in FIG. 5, 6, and 7, is representative of both assemblies 38, 40. Notched out portion 39 forms opposing faces 46 and 47 in the body 12, and aligned with the faces 46, 47 are corresponding faces 48, 49 in panel 26 formed by notched portion 43.

Extending from face 47 of the body 12 is pin 50 and opening into the opposing face 46 is an aperture 51. Similarly, extending from face 49 of the panel 26 is a pin 52 and opening into the opposing face 48 is an aperture 53. Extending through aperture 51 in the body 12 is a tubular member 54 retained in place by screws (not shown) and extending through aperture 53 in the panel 26 is a second tubular member 55 retained by screws 56. Fitted around the distal ends of tubular members 54, 55 and around pins 50, 52 is a hinge member 57.

As best shown in FIGS. 6 and 7, hinge member 57 is formed of two halves 57A, 57B, which are mirror images of each other. Each of the halves 57A, 57B (of which 57A shown in FIG. 7 is exemplary of both) has a recessed channel 58 therein having ends 31, 33 which connect to one side 35 of half 57A. On the opposite side 37 of half 57A are a pair of indentations 41, 59. The halves 57A, 57B are assembled with the mated ends 31, 33 of the channels 58 forming apertures surrounding the ends of tubular members 54, 55 and the indentation 41, 59 form apertures surrounds the ends of pins 50, 52. The channels 58 mate to form a passage through which a coiled ribbon 66 of wires is fitted as further described below.

The hinge members 38, 40 are double hinges capable of pivoting around tubular members 54 and pins 50 on the body 12 and of pivoting around tubular members 55 end pins 52 of the panel 26. Two O-rings 62 are fitted around the distal end of tubular member 55 to create resistance to the rotation of hinge member 38 with respect to the panel 26, and three O-rings 63 are fitted around the distal end of tubular member 54 to create resistance to movement of hinge members 38 with respect to the body 12.

Figure 10:
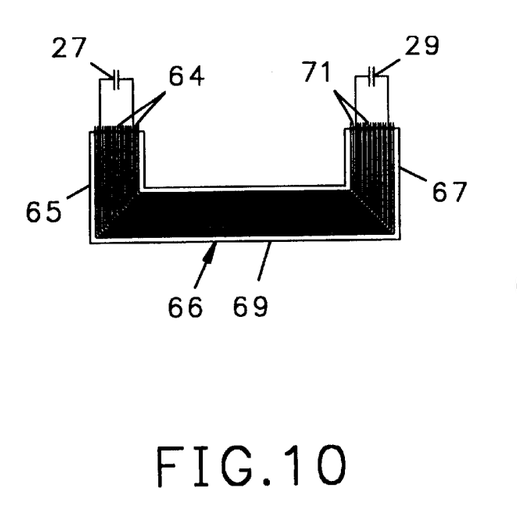
FIG. 10 is a plan view of the ribbon for use in the hinge assembly shown in FIGS. 4 and 5.
Figure 11:
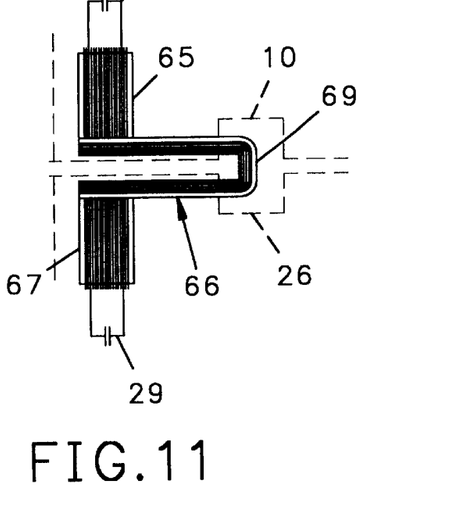
FIG. 11 is a plan view of the ribbon shown in FIG. 10 with the central portion thereof coiled for insertion into the hinge assembly shown in FIGS. 4 and 5.

Referring to FIGS. 10 and 11, a number of wires, perhaps 20 or more, are needed to connect the electronic components 27 of the computer 10 in the body 12 to the electronic components 29 of the screen 28. It has been found that if the larger number of wires needed to connect the components 27 of the computer to the components 29 of the screen are threaded through the open parts of a hinge, such as hinge assembly 38, the movement of the hinge will cause the wires extending through the hinge members to become damaged. Eventually the computer will fail as a result of damage to the wires joining the computer body 12 to the screen 28.

In accordance with one aspect of the invention, the wires which join the components 27 of the computer body to the components 29 of the screen are embedded in ribbon 66 of flexible insulating material. The ribbon may be manufactured using methods known in the art such as depositing lines of conductive material onto a flexible substrate.

As best seen in FIG. 10, the ribbon 66 has a short first end section 65 from which a plurality of wires 64—64 extend for attachment to the component 27 of the computer body 12. Similarly, the ribbon 66 has a short second end section 67 from which the opposite ends 71—71 of the wires extend for attachment to the components 29 of the screen. Between the first end section 65 and the second end section 67 is an elongate central section 69 oriented perpendicular to both the first end section 65 and the second end section 67 as shown.

As seen in FIGS. 5 and 11, to fit the ribbon 66 through the central opening of the first tubular member 54, the passage 58 of member 38, and through the central opening of the second tubular member 55, the central section 69 of the ribbon 66 is rolled into a coil. The rolled central section 67 is then folded as shown to conform to the shape of the interiors of the tubular members 54, 55 and the passage 58 of the hinge assembly 38. A hinge assembly 38 having a rolled ribbon 66 extending through the portions thereof is rotatable with respect to in the housing body 12 and with respect to this panel 26 without causing damage to the wires of the ribbon 66.

Figure 8:
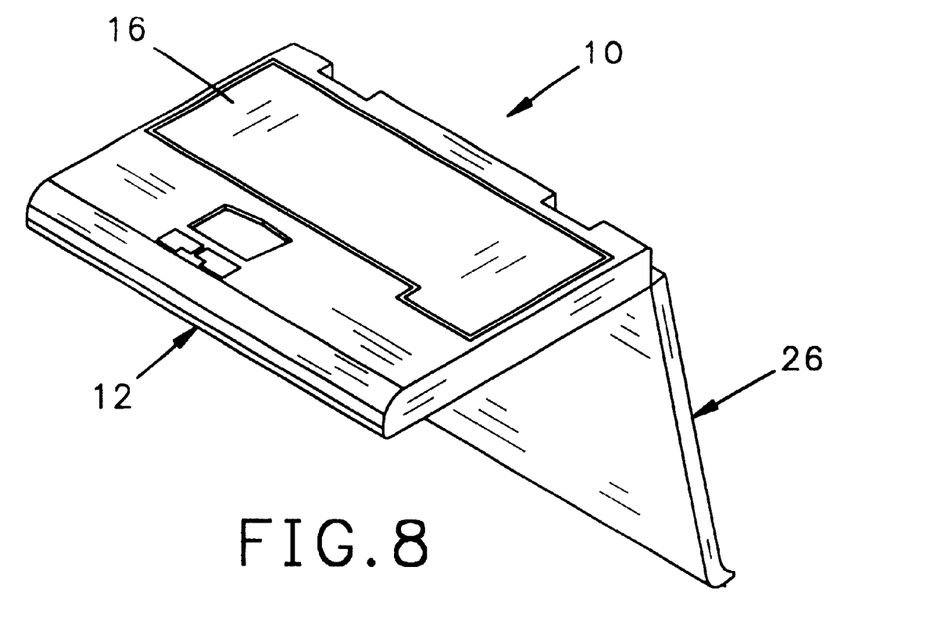
FIG. 8 is an isometric view of the computer shown in FIG. 1 with the viewing screen folded 270 degrees from the position shown in FIG. 1.
Figure 18:
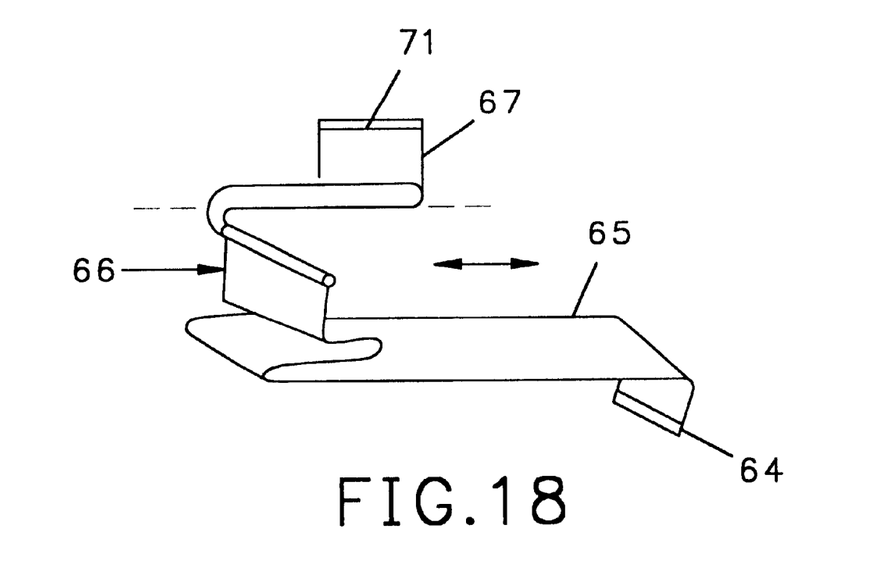
FIG. 18 is an isometric view of the ribbon connecting the computer body to the screen from the embodiment shown in FIG. 12.

The movement of the panel 26 from the closed position shown in FIG. 1 to the open position shown in FIG. 3 in which the screen 28 is visible to one using the keyboard 16, involves the rotation of the panel 26 around tubular members 55 and pins 52 of the hinge assemblies 38, 40. The rotation of the hinge assemblies 38, 40 and the panel 26 about the tubular members 54 and the pins 50 permits the rotation of the panel 26 from the positions shown in FIGS. 1, 2, and 3 to the position shown in FIGS. 8 and 9. When the panel is in the position shown in FIG. 9, the computer 10 can be mounted to the dashboard of an automobile, as shown in FIG. 18 with the keyboard wrapped behind the screen and the screen 28 visible to the occupants of the vehicle.

Referring to FIGS. 12–18 in another embodiment of a computer 68 the portions that are like those of the computer body 12' and panel 26' bear like indicia numbers except that they are primed. Like the first embodiment, the long side 36' of panel 26' has notches 45' forming shoulders 46' at opposite ends thereof for receiving portions of hinge assemblies 70 and 72.

Figure 14:
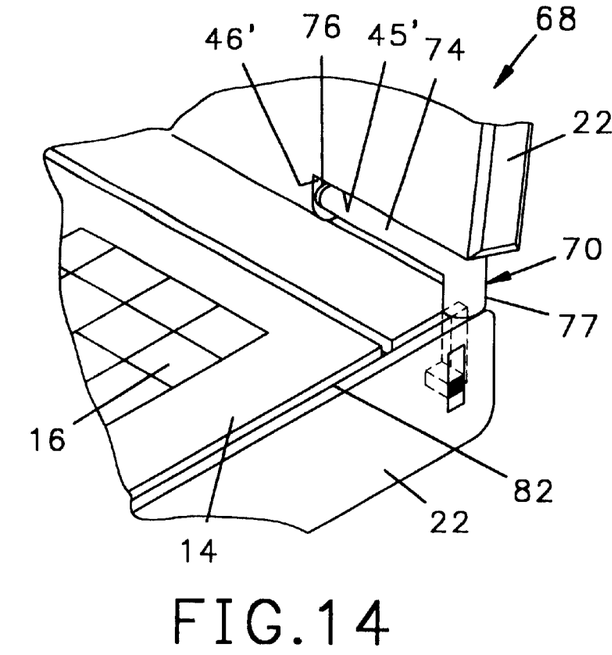
FIG. 14 is a fragmentary enlarged isometric view of the attachment of the viewing screen to the computer body shown in FIG. 12 with portions of the interior thereof shown in phantom lines.
Figure 15:
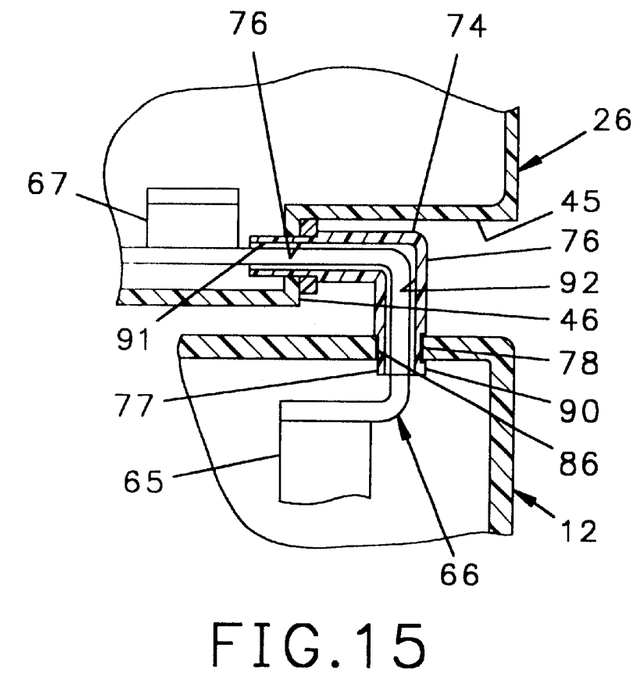
FIG. 15 is an enlarged cross sectional view of a connector for retaining the parts of a computer as shown in FIG. 12.
Figure 16:
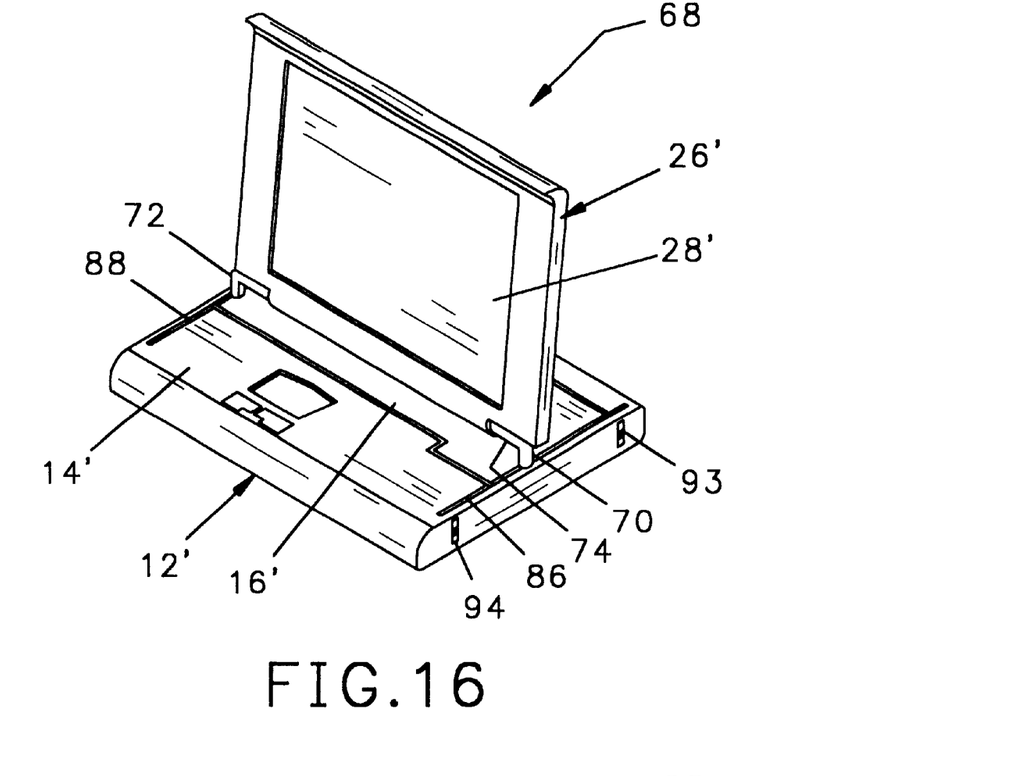
FIG. 16 is an enlarged isometric view of the computer shown in FIG. 12 with the viewing screen opened and the panel with the viewing screen thereon partially moved along the slots.

Referring further to FIGS. 14, 15, and 16 in which hinge assembly 70 is representative of both assemblies 70 and 72, the assemblies 70 each have an elongate tubular arm 74 which is rotatably received in an aperture 76 in the shoulder 46' of panel 26'. Oriented perpendicular to the axis of the arm 74 is a downwardly (as seen in FIG. 14) extending tubular leg 77, the lower end of which has parallel sides 77, 78 (shown in FIG. 15) that fit slideably between the sides of a track 86. As best shown in FIG. 16, the upper surface 14' of the housing of the computer 68 has a pair of parallel tracks 86, 88, extending along each side of the keyboard 16', and each track 86, 88 in engaged by the downwardly extending leg 76 of the associated hinge assembly 70, 72.

As best shown in FIG. 15, the leg 76 of each hinge assembly 70, 72 is retained in the associated track 86, 88 by a tab 90 at the lower end of the leg 76. Also, the inner opening 91 of the tubular arm 74 communicates with the opening 92 of the hollow leg 76 for receiving the coiled ribbon 66 of wires connecting the components 2' of the computer to the components 29' of the screen.

Figure 17:
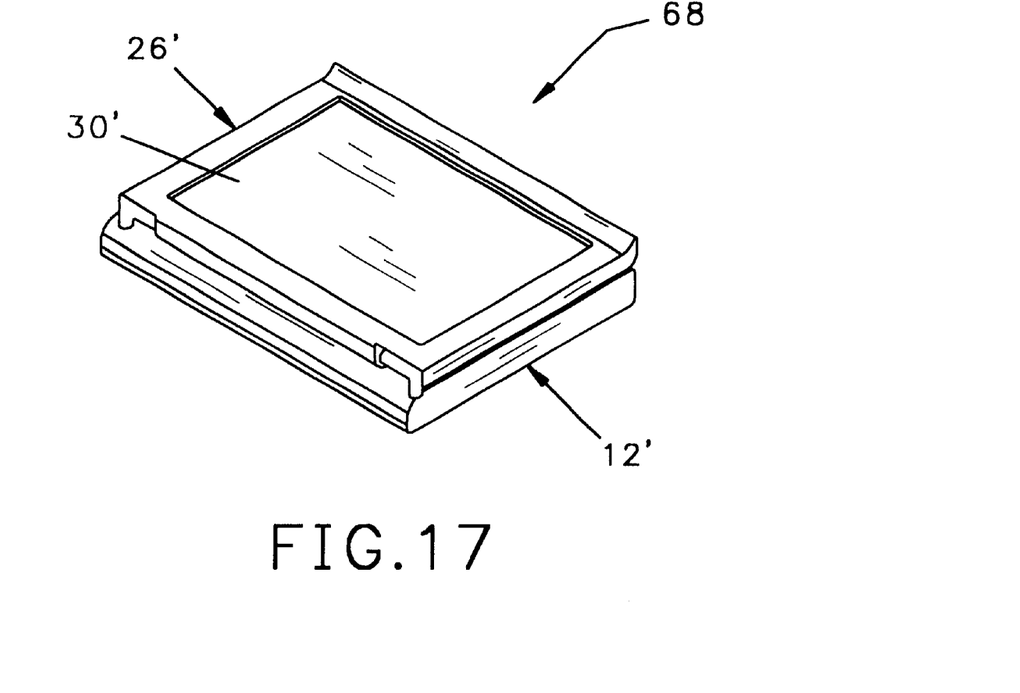
FIG. 17 is an isometric view of the computer body shown in FIG. 12 with the back of the viewing screen folded against the keyboard so that the screen is viewable.

To connect the components 27' of the computer to those of the screen 28', the wires are again configured into a ribbon 66 having a first end section 65, a second end section 67 and a central section 69 oriented perpendicular to the end sections 65 and 67 as shown in FIGS. 10 and 11. The central section 69 is again coiled as shown in FIG. 11 and inserted into the openings 91, 92 extending through the arm 74 and the leg 76 of the assembly 70. Referring to FIG. 17, in this embodiment the end section 65 connecting to the components 27' of the computer has an extended length as shown to permit the sliding of the legs 76 within the tracks 86, 88.

Figure 12:
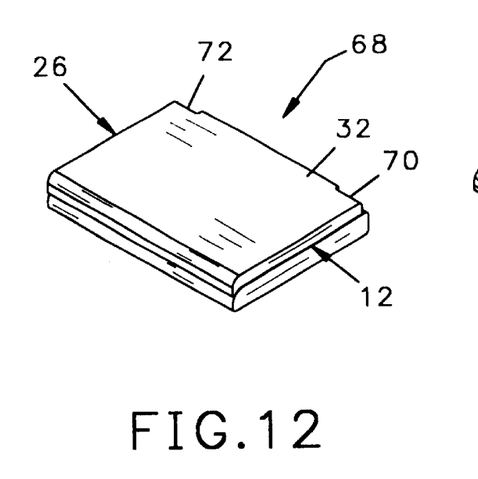
FIG. 12 is an isometric view of a second embodiment of a connector for retaining a viewing screen to the computer body with the screen closed on the keyboard.
Figure 13:
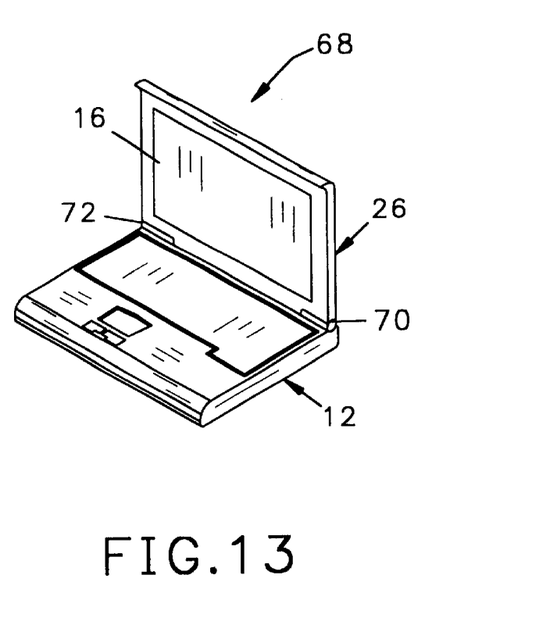
FIG. 13 is an isometric view of the computer of FIG. 12 with the viewing screen opened from the keyboard such that the computer is ready for use by an operator.

As best shown in FIG. 16, the invention further includes releasable locks 93, 94 at opposite ends of slots 86 which engage the downwardly extending leg 76. When lock 93 engages the lower end of leg 70, the panel 26' will pivot about the hinge assemblies 70, 72 from a closed position as shown in FIG. 12 to an open position as shown in FIG. 13. When the hinge assemblies 70, 72 are moved to the opposite end of the slots 86, 88 and the second lock 94 is engaged, the panel 26' can be rotated until the rear surface 32' of the viewing screen 2'8 contacts the keyboard 16' as shown in FIG. 17.

As can be seen, the computer in accordance with the present invention can be oriented with the viewing screen in any of three configurations. In the first configuration shown in FIGS. 1 and 12, the viewing screen is folded against the keyboard to protect the parts while the device is being transported. In the second configuration shown in FIGS. 3 and 13, the viewing screen 28' is at an angle of approximately 100° with the keyboard 16' so as to be visible while the keyboard is in use. In the third configuration shown in FIG. 9 and 17, the back 32 of the viewing screen 28 is folded against the computer body 12' leaving the viewing screen 28' visible.

Figure 9:
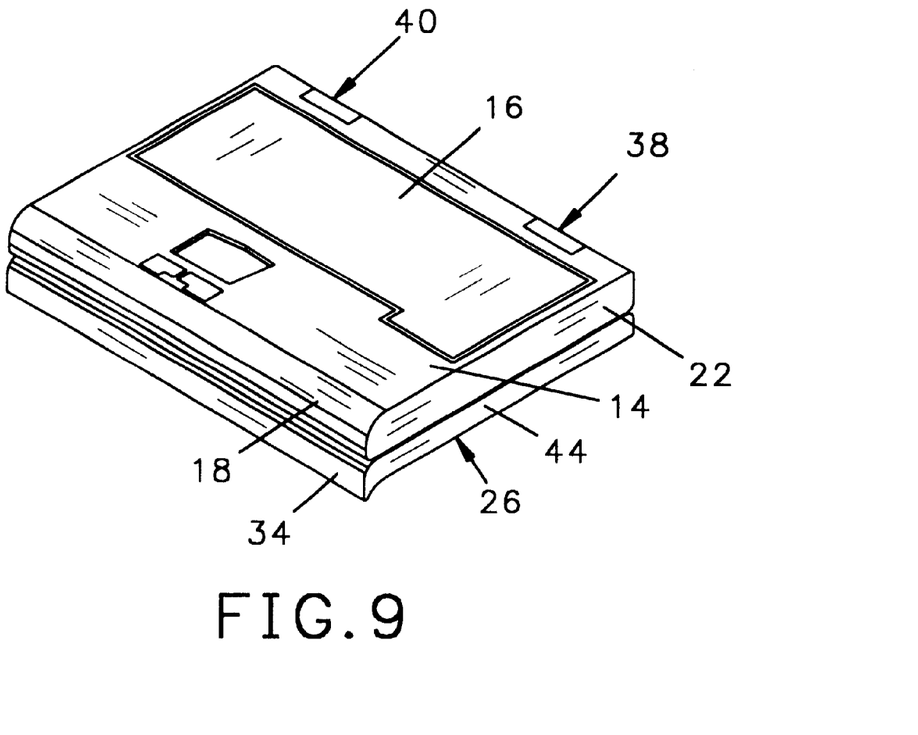
FIG. 9 is an isometric view of the computer shown in FIG. 1 with the viewing screen folded behind the computer body.
Figure 19:
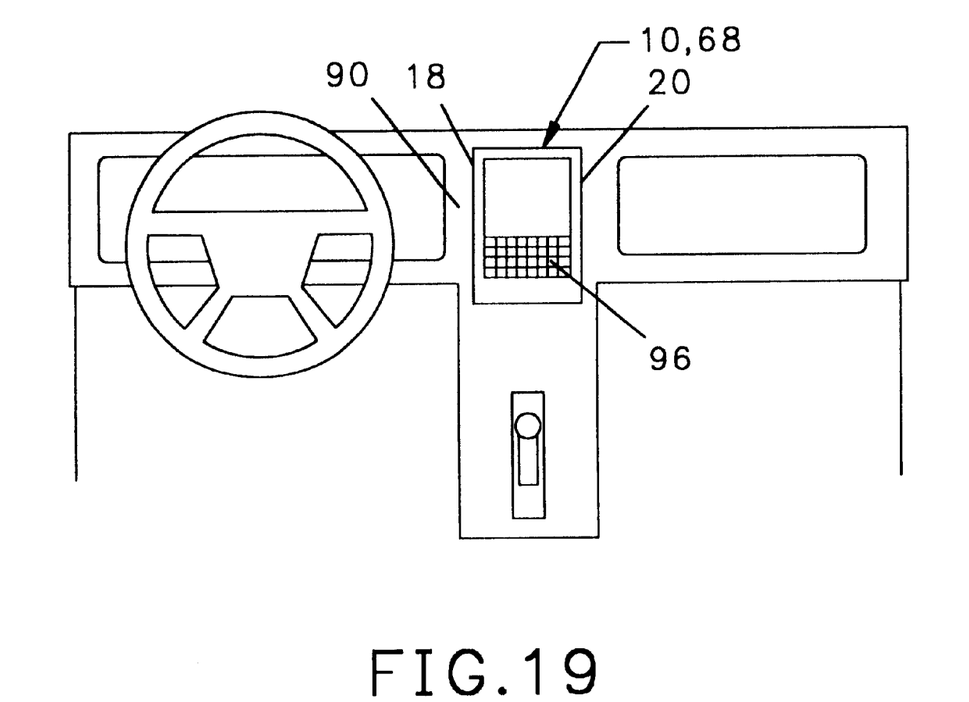
FIG. 19 depicts a viewing screen folded as shown in FIG. 9 and FIG. 17 and mounted on the dashboard of an automobile.

Referring to FIG. 19, the computer 10, 68 of the present invention can be mounted against the dashboard 90 of an automobile using any suitable means, including a computer dock as disclosed in my copending application serial No. 09/425,924. Preferably, the computer 10 is mounted with the back 32' of the screen 28' against the body 12' with the surface of the screen visible to the operator of the vehicle as shown in FIGS. 9 and 17. The computer 10 can be mounted on the dashboard of an automobile with the long sides 18', 20' of housing 12' oriented vertically as shown in FIG. 19.

Software is currently available for orienting the material displayed on the screen 28' ninety degrees. Software is also available to provide a virtual keyboard 96 operable by the touch of a finger on the lower portion of the screen as shown. A computer 10, 68 mounted in the vehicle as shown, is therefore useable by the occupants of the vehicle.

While the present invention has been disclosed with respect to two embodiments, it will be appreciated that many variations and modifications may be made without departing from the true spirit and scope of the invention. Therefore, it is the intent of the appended claims to cover all such variations and modifications which fall within the true spirit and scope of the invention.

What is claimed:

1. A computer comprising
   a computer body having an upper surface and a lower surface,
   a keyboard on said upper surface,
   a panel having a viewing screen and a back surface,
   means for joining said panel to said computer body for movement of said panel relative to said body between a first position with said viewing screen folded against said keyboard, a second position with said viewing screen angled with respect to said keyboard and a third position with said back surface against said computer body, and
   said means for joining including a hinge and a slide.

2. A computer in accordance with claim 1 wherein
   said hinge connects one of said computer body and said panel to said slide, and
   said slide is moveable adjacent to one short side of the other of said computer body and said panel.

3. A computer in accordance with claim 2 wherein said slide comprises,
   a slot on said other of said computer body and said panel,
   a slide leg moveable within said slot,
   said hinge having a central opening therein,
   said slide having a central opening therein,
   said central opening of said hinge communicating with said central opening of said slide,
   wiring joining said computer body to said screen, said wiring extending through said central opening of said hinge and said central opening of said slide.

4. A computer in accordance with claim 3 wherein said wiring is configured as a ribbon.

5. a computer in accordance with claim 4 wherein at least a portion of said ribbon is coiled.

6. A computer comprising a computer body having an upper surface, a lower surface, and a computer body side having edges connected to said upper surface and said lower surface, a keyboard on said upper surface, a panel having a viewing surface, a back surface, and a panel side having edges connected to said viewing surface and said back surface, hinge means between said computer body side and said panel side, said hinge means comprising a first hinge portion for hinged movement of said panel with respect to said computer body from a first position with said viewing surface folded against said keyboard to a second position with said viewing surface angled with respect to said keyboard, a second hinge portion for hinged movement of said panel from a first position with said viewing screen against said keyboard to a second position with said back surface against said lower surface of said computer body.

7. A computer in accordance with claim 6 and further comprising a connector portion between said first hinge portion and said second hinge portion.

8. A computer in accordance with claim 7 and further comprising said first hinge portion having a central opening, said second hinge portion having a central opening, said connector portion having a central opening joining said central opening of said first hinge portion and said second hinge portion, and wiring configured as a ribbon extending through said central portions of said first hinge portion, said connection portion and said second hinge portion.

9. A computer in accordance with claim 8 wherein at least a portion of said ribbon is coiled.

10. A hinge for hingeably connecting a first housing member to a second housing member where said first housing member contains certain electronic components and said second housing member contains certain other electronic components, said hinge comprising a tubular hinge member having an elongate central opening, defining a longitudinal axis, a first tubular end and a second tubular end, said first tubular end having an axis perpendicular to said longitudinal axis, said second tubular end having an axis perpendicular to said longitudinal axis and parallel to said axis of said first tubular end, said first housing member having a cylindrical aperture therein, said first tubular end of said tubular hinge member fitted in coaxial relationship with respect to said cylindrical aperture in said first housing member for pivotal attachment thereto, said second housing member having a cylindrical aperture therein, said second tubular end of said tubular hinge member fitted in coaxial relationship with respect to said cylindrical aperture in said second housing member for pivotal attachment thereto, a flexible tape of insulating material having a first end, a second end, and a plurality of wires within said tape, said wires extending from said first end to said second end of said tape, a first connector means at said first end of said tape for connecting said plurality of wires to said certain electronic components, a second connector means at said second end of said tape for connecting said plurality of wires to said certain other electronic components, and said tape extending through said central opening of said tubular hinge member.

11. The hinge of claim 10 wherein said flexible tape is coiled in said central opening of said tubular hinge member.

12. The hinge of claim 10 wherein said flexible tape has a longitudinal axis, and said flexible tape is coiled about said longitudinal axis.

13. A double hinge for hingeably connecting a first housing member to a second housing member were said first housing member contains certain electronic components and said second housing member contains certain other electronic components, said double hinge comprising a hinge member having a central body having a central cavity, a first tubular portion having a central opening, a first end fitted in said hinge member, a distal end, and a longitudinal axis, a second tubular portion having a central opening, a first end fitted in said hinge member, a distal end, and a longitudinal axis, said longitudinal axis of said first tubular portion parallel to said longitudinal axis of said second tubular portion, and spaced therefrom, said first housing member having a first aperture there, said distal end of said first tubular portion fitted in said first aperture, said second housing member having a second aperture therein, said distal end of said second tubular portion fitted in said second aperture, a flexible tape of insulating material having a first end, a second end, and a plurality of wires within said tape, said plurality of wires extending from said first end to said second end of said tape, and said tape extending through said central opening of said first tubular portion, through said central cavity of said hinge member and through said central opening of said second tubular portion.

14. A double hinge in accordance with claim 13 wherein at least a portion of said flexible tape is coiled.

15. A computer comprising a computer body having an upper surface and a lower surface, a keyboard on said upper surface, a panel having a viewing screen and a back surface, first means between said panel and said computer body for hinged movement of said panel with respect to said computer body from a first position with said viewing screen folded against said keyboard to a second position with said viewing screen angled with respect to said keyboard, and second means between said panel and said computer body for movement of said panel from a first position with said viewing screen against said keyboard to a second position with said back surface against said keyboard.

16. A computer comprising
a computer body having an upper surface and a lower surface,
a keyboard on said upper surface,
a panel having a viewing screen and a back surface,
a hinge between said panel and said computer body for hinged movement of said panel with respect to said computer body from a first position with said viewing screen folded against said keyboard to a second position with said viewing screen angled with respect to said keyboard, and
a slide between said panel and said computer body for movement of said panel from a first position with said viewing screen against said keyboard to a second position with said back surface against said computer body.

17. A computer in accordance with claim 16 wherein
said hinge connects one of said computer body and said panel to said slide, and
said slide is moveable along at least one short side of said other of said computer body and said panel.

18. A computer in accordance with claim 17 wherein said slide comprises
a slot on said other of said computer body and said panel,
said slide member moveable along said slot,
said hinge having a central opening,
said slide having a central opening,
said central opening of said hinge in communication with said central opening of said slide, and
wiring configured as a ribbon extending through said central opening of said hinge end of said slide.

19. The computer in accordance with claim 18 wherein at least a portion of said ribbon is coiled.

20. A hinge for hingeably connecting a first housing member to a second housing member where said first housing member contains certain electronic components and said second housing member contains certain other electronic components, said hinge comprising
a tubular hinge member having a central opening,
said tubular hinge member hingeably connecting said first housing member to said second housing member,
a plurality of wires having lengths, said plurality of wires extending from said first housing number to said second housing member to connect said certain electronic components to said certain other electronic components,
said plurality of wires configured into a ribbon in which said lengths of said wires extend parallel to one another and having a pair of outermost wires between which other lengths of said plurality of wires extend,
at least a portion of said ribbon wound into a coil wherein said coil is wound around an axis parallel to said lengths of said plurality of wires, and
said coiled portion of said ribbon extends through said tubular hinge member.

* * * * *